United States Patent Office

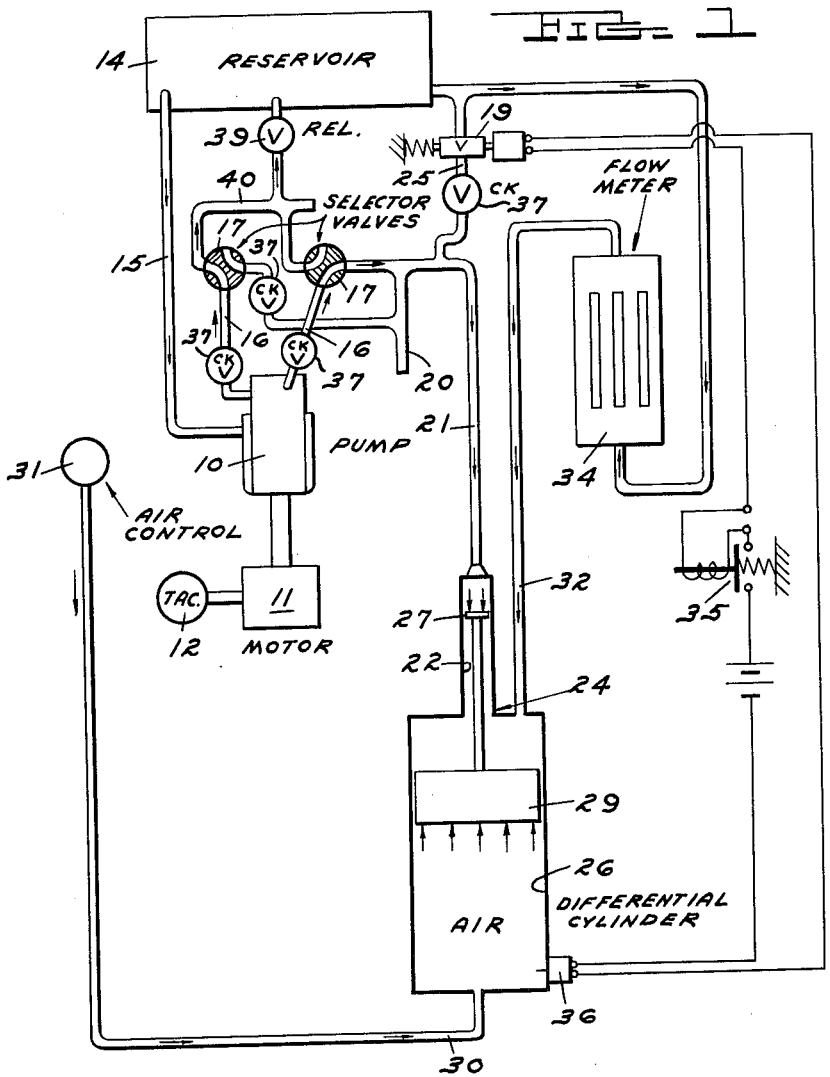
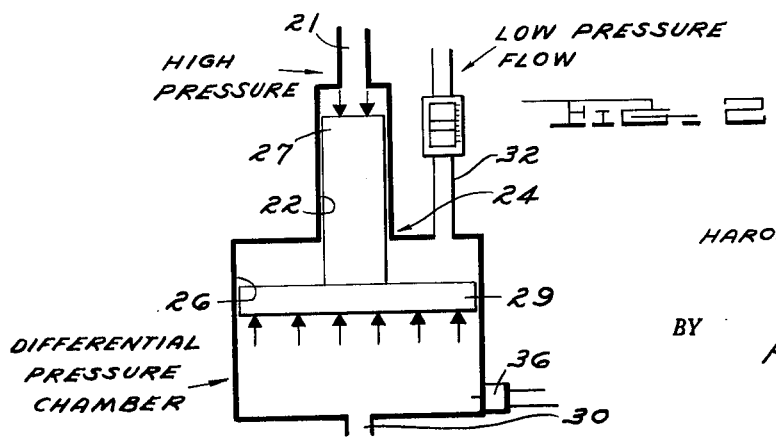

3,230,761
Patented Jan. 25, 1966

3,230,761
FUEL INJECTOR PUMP TEST DEVICE
Harold A. Sanders, Huntington Wood, Mich., assignor to Ford Motor Company, Dearborn, Mich., a corporation of Delaware
Filed May 3, 1961, Ser. No. 107,371
7 Claims. (Cl. 73—119)

This invention relates to fuel injection pump test equipment.

Internal combustion engines of the fuel injection type in which the charge of fuel is injected directly into the cylinders, e.g. diesel engines, utilize a fuel pump for metering the fuel charge to each cylinder in accord with speed and power requirements of the engine and injecting the fuel under high pressure at the proper time through an injector nozzle leading into the cylinder. It is highly important for maximum power and smooth idling and running that exactly the same amount of fuel be delivered to each cylinder. Fuel injector pumps customarily are provided with means for precisely adjusting the amount of fuel injected into each cylinder. The present invention is directed to improved test equipment useful in testing and adjusting such pumps.

The device of the present invention utilizes a differential cylinder of expansible chamber which serves to magnify the output of the pump sufficiently so that the rate of flow from any one cylinder can be measured by more or less conventional flow meters. This arrangement also facilitates the pump discharge against a pressure on the order of that encountered in use whereby the pumps may be tested and adjusted while operating under conditions more nearly corresponding to those encountered in actual use.

Among the objects of the present invention are to provide an improved fuel injector pump test device and method of testing such pumps by magnifying the rate of flow many times and measuring the magnified rate; to provide such an improved device wherein the pump discharges against pressure; and generally to improve devices of the type described. Other objects and objects relating to details of manufacture and use will be more apparent from the detailed description to follow.

My invention is clearly defined in the appended claims. In the claims, as well as in the description, parts may at times be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming part of this specification, in which:

FIGURE 1 is a schematic drawing of a fuel injector pump test device according to the present invention, the pump to be tested being shown in the hydraulic circuit.

FIGURE 2 is a schematic drawing, at enlarged scale, of the differential cylinder and flow meter portion of the device shown in FIGURE 1.

Internal combustion engine fuel injector pumps are designed to inject a very small quantity of fuel into each cylinder of the engine. The fuel is injected into each cylinder once every revolution of a two-cycle engine and once every two revolutions of a four-cycle engine and is injected at pressures between 3000 and 5000 p.s.i. The test device of the present invention is designed to measure the flow rate of discharges as low as three cubic millimeters occurring 50 times a minute or at a rate of approximately three-quarters of a drop per minute.

Referring now to the drawings, a fuel injection pump 10, e.g. a diesel fuel injector pump, to be tested may be mounted on the device. The pump 10 is connected to be driven by a variable speed electric motor 11. The motor 11 includes reduction gearing whereby the pump during test may be driven at speeds corresponding to the speeds at which the pump is driven when in operation on a diesel engine or other internal combustion engine. The motor 11 may be driven at a selected constant speed which, in the present instance, may be anywhere between 75 r.p.m. and 1250 r.p.m., corresponding to engine speeds between 150 r.p.m. and 2500 r.p.m. of a four-cycle engine. A tachometer 12, driven by the motor 11, indicates actual pump and motor speed.

The pump 10 is supplied with fluid, which may be ordinary No. 2 diesel fuel, from a reservoir 14 through an intake line 15 connected to the fuel intake of the pump in the usual manner. A series of discharge lines lead from the pump 10, a discharge line being provided for each cylinder of the engine for which the pump is intended and only one discharge line 16 being indicated. For example, a fuel injector pump for a four-cylinder engine is provided with four discharge lines, each line leading to a fuel injector mounted on the engine and communicating with the interior of one of the cylinders of the engine. The discharge lines preferably are formed of flexible wire mesh reinforced rubber hose for greater elasticity than metal tubing, so as to smooth out in part the small individual impulses in the pump and produce a more nearly uniform discharge.

A selector valve 17 is provided for each discharge line 16, one selector valve being shown. Each selector valve 17 is a manually controlled two-position valve which may be positioned either to pass for test the discharge from any line 16 leading from the pump or to return the fuel to the reservoir 14.

Each selector valve 17 is connected to the small diameter cylinder 22 of a differential cylinder 24 by a manifold 20 and line 21. A line 25 connects the line 21 with the reservoir 14, and a test valve 19 controls flow through the line 25 to periodically return to the reservoir the fluid received by the differential cylinder. The test valve 19 is solenoid controlled and spring-biased to open position. Operation of this valve will be described in more detail hereafter.

The differential cylinder 24 includes a large diameter cylinder 26 having a diameter many times the diameter of the small diameter cylinder 22 and which, for purposes of illustration, may be 51 times the area of the small cylinder. The small and large cylinders receive pistons 27 and 29, respectively, which are connected for common movement. Accordingly, the volume of the large diameter cylinder 26 of the differential cylinder swept by the piston 29 will be 51 times the volume swept by the small piston 27 for equivalent linear movement.

Air pressure is applied to the lower face of the piston 29 by means of an air line 30 leading from a source of air 31 capable of providing a supply of air at about 20 p.s.i. The arrangement is such that the air pressure against the large piston 29 of the differential cylinder impresses a static pressure on the fuel above the small piston 27 of 1000 p.s.i., against which the pump 10 to be tested is discharging. During operation, the instantaneous pressure may reach 4000 p.s.i. This pressure approximates the ordinary discharge pressure of a fuel injector pump in operation on an engine.

The large diameter cylinder 26 behind the piston 29 is connected with the reservoir 14 by a line 32 so that as the piston 29 moves downwardly as indicated in the drawings, the piston will pull fuel from the reservoir in behind the piston due to atmospheric pressure on the surface of the fluid in the reservoir. The pressure of the fuel on the back of piston 29 will be only the hydrostatic pressure of the liquid (less than 1 p.s.i.).

A liquid flow meter 34 is inserted in the line 32. The flow meter 34 preferably is of the type in which a bobber is carried varying distances up a glass tube against the force of gravity, depending on the volume of flow. Preferably, the flow meter 34 comprises three parallel tubes capable of reading flow anywhere between 5 and 3500 cc. per minute. The flow meter 34 provides an instantaneous means of reading flow through the line 32 at any time. The flow through line 32 is proportional to, but fifty times greater than, the flow through line 21. By thus magnifying the flow, the delivery rate of any line 16 from the pump at any speed within the operating range may easily and accurately be determined and compared with flow from the other lines, and the pump output adjusted accordingly.

The test valve 19 may be actuated by a manually operated magnetic switch 35 which is spring-biased open and held closed by the current energizing the valve 19. Measuring the flow of any line 16 is initiated by starting the motor 11 to drive the pump and then operating switch 35 to close line 25 and direct fluid to the differential cylinder 24.

After pistons of the differential cylinder have been forced downwardly against air pressure until the piston 29 has reached the lower end of its travel, a normally closed microswitch 36 is actuated by the piston 29 to interrupt the circuit to the test valve 19 and cause this valve to open and permit the fluid within the differential cylinder above the small piston 27 to be discharged to the reservoir through line 25 due to the air pressure on the large piston 29, restoring the pistons for additional testing. At the same time, the fluid above the large piston 29 is forced back through the flow meter 34 to the reservoir 14.

In order to maintain the various lines full of fluid at all times and to prevent return flow of fluid to the pumps, one-way valves 37 may be placed in the lines 16 as indicated in the drawings. Also, a pressure relief valve 39 may be inserted in a manifold 40 connecting the selector valves with the reservoir 14. The manifold 40 serves to return to the reservoir fluid discharged from the lines 16 which are not then being measured, and the valve 39 maintains a back pressure on the manifold and pump to make the load on all of the cylinders of the pump more uniform.

I claim:

1. The method of testing an internal combustion engine fuel injector pump, comprising the steps of: causing said pump to deliver a controlled first volume of liquid; utilizing said first volume of liquid to generate flow of a second volume of liquid, the volume of said second volume of liquid being a preselected ratio many times the first volume; and measuring the rate of flow of said second volume of liquid to determine pump performance.

2. The method of claim 1 wherein said first volume of of liquid is delivered against a static pressure of at least 1,000 p.s.i.

3. A test device for fuel injector pumps for multi-cylinder engines, comprising: a differential expansible chamber device including two expansible chambers of different diameters joined for simultaneous fluid displacing movement, the cross-section of the larger chamber being many times the cross-section of the smaller chamber; means for connecting the pump output for any cylinder of the engine with the smaller chamber of the differential expansible chamber device, and means for measuring the rate of volume displacement of the larger chamber of the differential expansible chamber device.

4. A test device for fuel injector pumps for multi-cylinder engines, comprising: a differential cylinder, a small and a large diameter piston received in the cylinder, the cross-sectional area of the larger piston being many times the area of the smaller piston and the pistons being interconnected for movement together; means for connecting the pump output for any cylinder of the engine with the smaller cylinder of the differential cylinder to displace the pistons, and means for measuring the rate of volume displacement of the larger piston.

5. A test device for fuel injector pumps for multi-cylinder engines, comprising: a differential cylinder, a small and a large diameter piston received in the cylinder, the cross-sectional area of the larger piston being many times the area of the smaller piston and the pistons being interconnected for movement together; means for connecting the pump output for any cylinder of the engine with the smaller cylinder of the differential cylinder to displace the pistons, a body of liquid displaced by the larger piston, and a flow meter for measuring the rate of liquid displacement of the larger piston.

6. A test device for fuel injector pumps for multi-cylinder engines, comprising: a differential cylinder, a small and a large diameter piston received in the cylinder, the cross-sectional area of the larger piston being many times the area of the smaller piston and the pistons being interconnected for movement together, means for connecting the pump output for any cylinder of the engine with the smaller cylinder of the differential cylinder to displace the pistons, means for introducing a liquid behind the larger piston as it is displaced, and a flow meter for measuring the rate of flow of liquid introduced behind said larger piston.

7. A test device for fuel injector pumps for multi-cylinder engines, comprising: a differential cylinder, a small and a large diameter piston received in the cylinder, the cross-sectional area of the larger piston being many times the area of the smaller piston and the pistons being interconnected for movement together, means for connecting the pump output for any cylinder of the engine with the the smaller cylinder of the differential cylinder to displace the pistons, means for introducing a liquid behind the larger piston as it is displaced, a flow meter for measuring the rate of flow of liquid introduced behind said larger piston, and means for maintaining air pressure against the front of the larger piston to oppose the displacement of the pistons.

References Cited by the Examiner

UNITED STATES PATENTS

| 1,368,147 | 2/1921 | Hennebohle | 73—419 X |
| 2,437,440 | 3/1948 | Rigden | 73—419 X |
| 2,612,777 | 10/1952 | Greer | 73—168 |

FOREIGN PATENTS 826,211  12/1959  Great Britain.

RICHARD C. QUEISSER, *Primary Examiner.*

ROBERT L. EVANS, *Examiner.*